United States Patent [19]

Herchenback et al.

[11] Patent Number: 4,948,287
[45] Date of Patent: Aug. 14, 1990

[54] BEARING BALL FOR A THREE-POINT CONNECTING DEVICE

[75] Inventors: Paul Herchenback; Norbert Müller, both of Ruppichteroth, Fed. Rep. of Germany

[73] Assignee: Jean Walterscheid GmbH, Fed. Rep. of Germany

[21] Appl. No.: 387,240

[22] Filed: Jul. 28, 1989

[30] Foreign Application Priority Data

Sep. 17, 1988 [DE] Fed. Rep. of Germany ....... 3831677

[51] Int. Cl.⁵ ................................................. B25G 3/00
[52] U.S. Cl. ..................................... 403/13; 403/131; 403/122
[58] Field of Search ............... 285/382.5; 29/507, 523, 29/149.5 B; 403/131, 122, 163, 161, 13

[56] References Cited

U.S. PATENT DOCUMENTS

| | | | |
|---|---|---|---|
| 2,477,676 | 8/1949 | Woodling | 29/523 UX |
| 2,673,507 | 3/1954 | Sawyer | 280/477 |
| 4,243,192 | 1/1981 | Johnson | 403/131 X |
| 4,619,543 | 10/1986 | Vollmer et al. | 403/122 X |
| 4,842,310 | 6/1989 | Muffke et al. | 285/382.5 |

Primary Examiner—Andrew V. Kindrat
Attorney, Agent, or Firm—Toren, McGeady & Associates

[57] ABSTRACT

The invention relates to a bearing ball (10, 11) for receiving the implement pin (8, 9) of an agricultural implement (1) in the catching jaw (7) of the catching hook (6) of a three-point connecting device (3) belonging to a tractor (2). The bearing ball comprises a hollow ball (2) with a cylindrical tube (14) passing through it. The central region of the cylindrical tube (14) has been provided with a formation (15) which extends radically and supports the inner face (13) of the hollow ball (12) in a force-free way. It secures the hollow ball (12) on the cylindrical tube (14) in the axial direction and permits relative rotation between the two. This provides better support because only the ends of the cylindrical tube (14) rest against the implement pin and bending of the cylindrical tube (14) no longer adversely affects the bearing ball.

3 Claims, 2 Drawing Sheets

BEARING BALL FOR A THREE-POINT CONNECTING DEVICE

BACKGROUND OF THE INVENTION

1. Field of the Invention

The invention relates to a bearing ball for a coupling pin on an agricultural implement for connecting the implement to the three-point connecting device or hitch of a tractor, which ball is designed as a hollow member into which a cylindrical tube which may be attached to the coupling pin is inserted, the bearing ball, in the coupled condition, being accommodated in the hook jaw of a hook belonging to the three-point connecting device.

2. Description of Prior Art

In one prior art bearing ball (DE-PS No. 29 22 716) the two ends of the cylindrical tube are connected to the catching ball by outturned end portions of the tube. The outturning of the tube ensures a firm connection between the hollow ball and the cylindrical tube. In cases where connection is effected by means of a pin, the hollow ball is provided with a cylindrical extension through which the cylindrical tube passes, with both parts being provided with a transverse bore for inserting the pin. The disadvantage of this design is that, on the one hand, as a result of the outturned ends provided on both sides and the continuous design of the cylindrical tube, bending of the implement pin after the bearing ball has been fitted with the cylindrical tube, results in separation forces which act on the bearing ball and adversely influence or destroy the connection between the bearing ball and the cylindrical tube. Furthermore, as a result of the close connection between the hollow bearing ball and the cylindrical tube, any relative movements between the coupling hook accommodating the bearing ball and the outer face of the bearing ball cause wear to occur essentially in the region of the outer face of the bearing ball and of the locking pin of the coupling hook. In consequence, there is a risk that such wear may result in a greater play, as a result of which the locking function would not be permanently ensured.

SUMMARY OF THE INVENTION

It is therefore the object of the present invention to provide a bearing ball in the case of which bursting of the connection between the bearing ball and the cylindrical tube due to bending of the implement pin is avoided and in the case of which, furthermore, the bearing ball is accommodated in the catching hook of the three-point connecting device in a practically wear-free way over a long period of service life.

The invention provides a bearing ball for a coupling pin on an agricultural implement for connecting the implement to the three-point connecting device of a tractor, which ball is designed as a hollow member into which a cylindrical tube which may be attached to the coupling pin is inserted, the bearing ball, in the coupled condition, being accommodated in the hook jaw of a hook belonging to the three-point connecting device, wherein both ends of the cylindrical tube project from the bearing ball, the cylindrical tube in its central region has been provided with a radially outwardly extending formation which contacts the inner wall of the bearing ball in a force-free way and supports the bearing ball from the inside, and the bearing ball is rotatable relative to the cylindrical tube but is not axially movable relative thereto.

The advantage of the design according to the invention is that the formation provides two supporting regions by means of which the cylindrical tube rests on the implement pin. As the pin does not rest against the centre of the cylindrical tube, it can bend freely in this region. Bending of the implement pin does not adversely affect the connection between the cylindrical tube and the bearing ball nor does it affect the strength of the bearing ball itself. The rotatable design ensures that, relative movement between the bearing ball and the catching hook at the tractor end or its locking pin no longer occurs. The relative movement occurs between the bearing ball and the cylindrical tube. This means that there is no longer any wear in the region of the outer face of the bearing ball nor is there any wear at the locking pin of the catching hook of the three-point connecting device. This also advantageously affects the functioning of the three-point connecting device. Its service life is extended and the risk of any play occurring between the bearing ball and catching hook (which would lead to an adverse effect on the locking function) is eliminated.

Furthermore, the formation in the central region of the cylindrical tube provides good support for the catching hook in the radial direction and, additionally, secures the bearing ball on the cylindrical tube in the axial direction. Its functioning is ensured independently of whether the bearing ball is used at the upper or lower articulation point. In the case of the upper articulation point, the problem of fixing which in prior art designs may occur as a result of lateral clamping or rusting is avoided. In the case of the bearing ball associated with the lower steering arm, in prior art designs such fixing is caused by the socket pin on the implement pin and this problem is also avoided.

In a further embodiment of the invention, one of the ends of the cylindrical tube projecting from the bearing ball is longer than the other end, and the longer end is provided with a transverse bore for passing through the inserting pin to be attached to the implement pin.

Furthermore, it is proposed that the longer end should be provided with a catching profile. Such a profile facilitates threading in and lateral alignment of the catching hook of the lower steering arm relative to the implement to be connected.

BRIEF DESCRIPTION OF THE DRAWINGS

Two preferred embodiments of the invention as well as its use in connection with a tractor/implement combination are diagrammatically illustrated in the drawings wherein.

DESCRIPTION OF PREFERRED EMBODIMENTS

Figure 1:
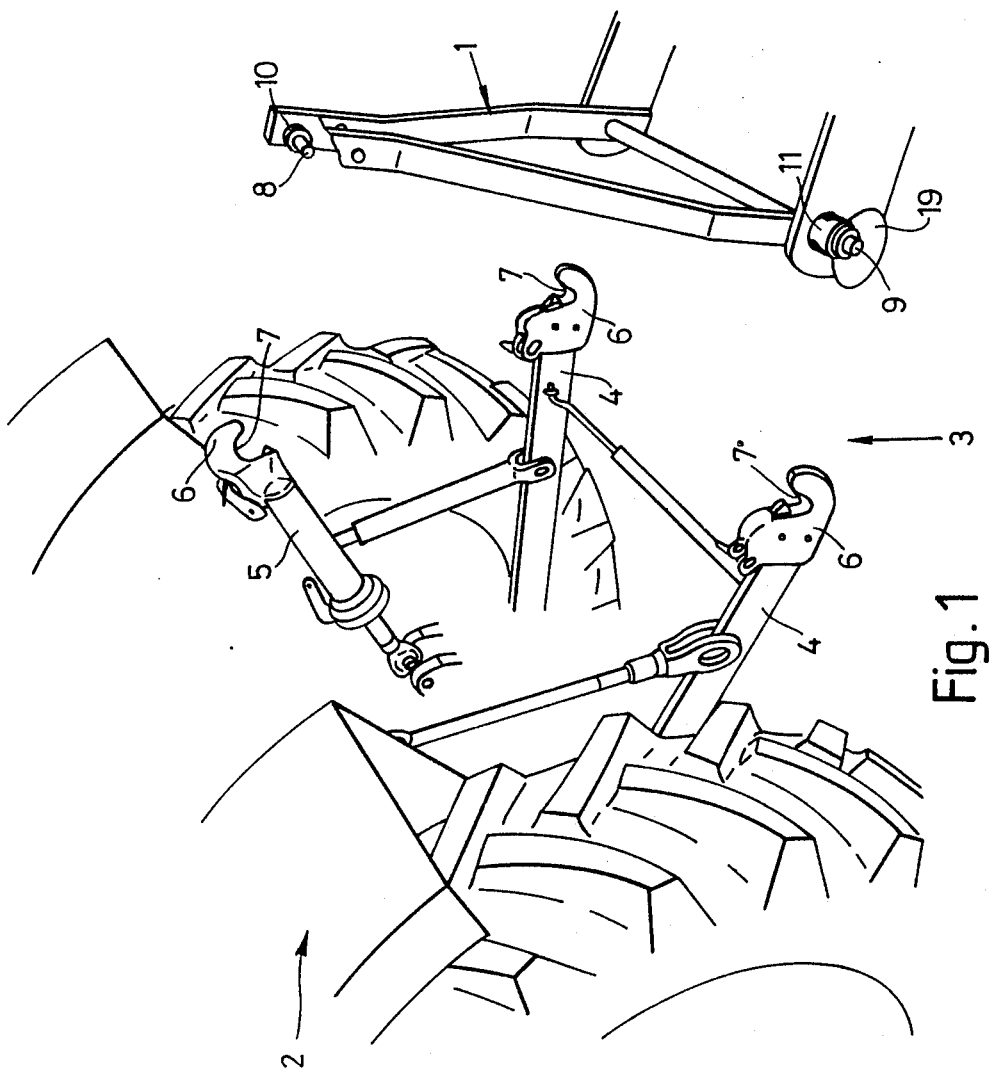
FIG. 1 contains a partial view of a tractor and an implement to be attached.
Figure 2:
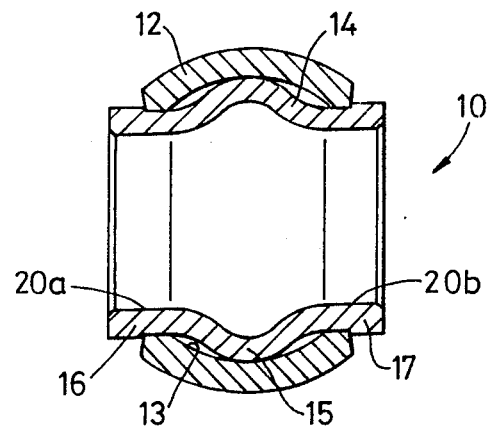
FIG. 2 shows a bearing ball for the upper articulation point.

As illustrated in FIG. 1, the implement 1 may be connected to the tractor 2 by means of a three-point connecting device 3. The three-point connecting device comprises two lower steering arms 4 arranged in the lower region of the tractor so as to be laterally offset relative to its longitudinal axis. Furthermore, the tractor 2 comprises an upper steering arm 5 extending in the region of the longitudinal axis. The lower steering arm 4 and the upper steering arm 5 have each been provided with a catching hook 6 comprising a catching jaw 7 which is lockable by means of a locking pin. The implement 1 has been provided with corresponding upper and lower articulation points. The upper articulation point is provided by a pin 8 and the lower articulation points are provided by pins 9. The upper implement pin 8 is associated with the upper bearing ball 10 and the two lower implement pins 9 with the lower bearing balls 11. The two lower bearing balls 11 serve to establish the connection with the lower steering arms 4 and the upper bearing ball 10 effects the connection with the upper steering arm 5. The bearing balls 10, 11 are each accommodated in the catching jaw 7 of one of the catching hooks 6. FIG. 2 shows a bearing ball 10 for an upper articulation point, for example, and FIG. 3 is a longitudinal section of a bearing ball 11 for a lower articulation point.

The upper bearing ball 10 illustrated in FIG. 2 comprises a hollow ball 12 having two lateral apertures. A cylindrical tube 14 is inserted into this hollow ball 12 and projects at both ends with equal distances from the hollow ball 12. The two ends have been given the reference numbers 16, 17. In its central region, the cylindrical tube 14 has been provided with a formation 15 which extends radially and may be produced by hydraulic expansion or upsetting for example. The outer face of the formation rests against the inner face 13 of the hollow ball 12 with play in a force free way in order to provide support for the hollow ball 12. The same applies to pairing the bores in the hollow ball with the outer face of the cylindrical tube 14 i.e. the two ends 16 and 17. The formation 15 essentially achieves axial fixing of the hollow ball 12 on the cylindrical tube 14. Furthermore, the formation 15 provides two support regions 20a and 20b by means of which the cylindrical tube 14 is supported on the pin 8.

Figure 3:
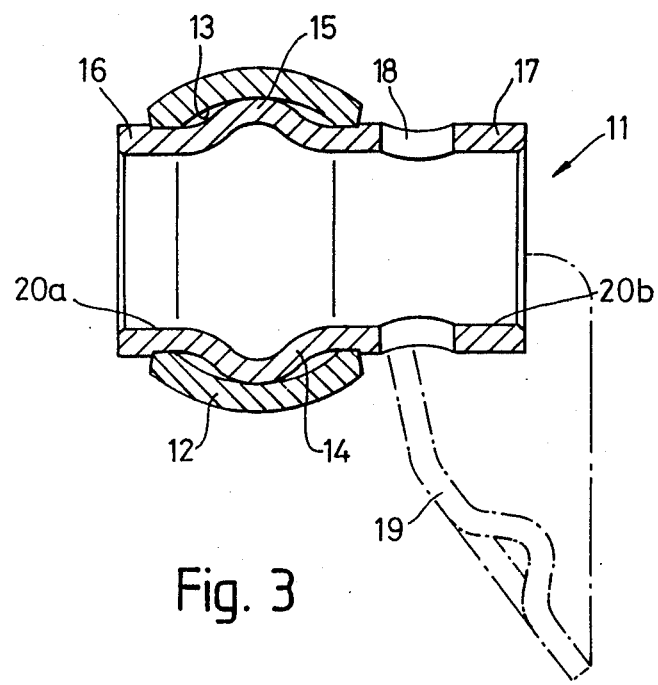
FIG. 3 is a longitudinal section through a bearing ball for a lower articulation point.

FIG. 3, finally, shows the lower bearing ball 11 in the case of which the hollow ball 12 is again fixed and supported on the cylindrical tube 14 by the formation 15. As a result, the hollow ball 12 is again arranged on the cylindrical tube 14 so as to be rotatable. In this embodiment, however, one of the ends 16, 17, i.e. end 17, is longer than the other end of the cylindrical tube 14. The longer end 17 of the cylindrical tube 14 comprises a through-bore 18 which is arranged so as to correspond to a transverse bore in the lower implement pin 9 and serves to provide a passage for a plug so that the bearing ball 11 is fixed on the lower implement pin 9 both laterally and in respect of rotation. Additionally, the longer end 16 may be provided with a catching profile 19 which is illustrated in a dashed line only and serves for the lateral alignment of the catching hook 6 relative to the bearing ball 11.

We claim:

1. A bearing ball for a coupling pin on an agricultural implement for connecting the implement to the three-point connecting device of a tractor, which ball is designed as a hollow member into which a cylindrical tube which may be attached to the coupling pin is inserted, the bearing ball, in the coupled condition, being accommodated in the hook jaw of a hook belonging to the three-point connecting device, wherein both ends of the cylindrical tube project from the bearing ball, the cylindrical tube in its central region has been provided with a radially outwardly extending formation which contacts the inner wall of the bearing ball in a force-free way and supports the bearing ball from the inside, and the bearing ball is rotatable relative to the cylindrical tube but is not axially movable relative thereto.

2. A bearing ball according to claim 1, wherein one of the ends of the cylindrical tube projecting from the bearing ball is longer than the other end and the longer end is provided with a transverse bore.

3. A bearing ball according to claim 2, wherein the longer end is provided with a catching profile.

* * * * *